(12) United States Patent
Williams et al.

(10) Patent No.: US 8,131,879 B1
(45) Date of Patent: Mar. 6, 2012

(54) USE OF ETHERNET FRAMES FOR EXCHANGING CONTROL AND STATUS INFORMATION WITHIN AN HPNA CONTROLLER

(75) Inventors: Robert Williams, Cupertino, CA (US); William Whu-Ming Young, Palo Alto, CA (US); Peter K. Chow, Mississauga (CA)

(73) Assignee: GLOBALFOUNDRIES Inc., Grand Cayman (KY)

( * ) Notice: Subject to any disclaimer, the term of this patent is extended or adjusted under 35 U.S.C. 154(b) by 3098 days.

(21) Appl. No.: 10/232,300

(22) Filed: Aug. 30, 2002

(51) Int. Cl.
*G06F 15/16* (2006.01)
*G06F 15/177* (2006.01)

(52) U.S. Cl. ....................... 709/250; 709/221

(58) Field of Classification Search ................ None
See application file for complete search history.

(56) References Cited

U.S. PATENT DOCUMENTS

| | | | |
|---|---|---|---|
| 6,208,637 B1 * | 3/2001 | Eames | 370/352 |
| 6,574,237 B1 * | 6/2003 | Bullman et al. | 370/465 |
| 6,701,406 B1 * | 3/2004 | Chang et al. | 710/310 |
| 6,781,989 B1 * | 8/2004 | Acharya | 370/392 |
| 6,801,541 B1 * | 10/2004 | Maleck | 370/466 |
| 6,839,345 B2 * | 1/2005 | Lu et al. | 370/365 |
| 6,996,124 B1 * | 2/2006 | Chow | 370/466 |
| 7,164,681 B2 * | 1/2007 | Karighattam et al. | 370/394 |
| 2003/0012213 A1 * | 1/2003 | Karighattam et al. | 370/428 |
| 2004/0004974 A1 * | 1/2004 | Gaspar | 370/463 |

OTHER PUBLICATIONS

"Interface Specification for HomePNA 2.0 10 M8 Technology 2.07.07," Home Phoneline Networking Alliance, 1999, pp. 1-81.

* cited by examiner

*Primary Examiner* — John B. Walsh
(74) *Attorney, Agent, or Firm* — Ditthavong Mori & Steiner, P.C.

(57) ABSTRACT

A method for providing control information between a host and a home phone line network via an Ethernet controller includes: determining if the control information is to be transmitted to the home phone line network or is received from the home phone line network; generating a first home phone line network data frame from a frame control frame (FCF) and a corresponding first Ethernet data frame received from the Ethernet controller, if the control information is to be transmitted to the home phone line network; and generating a second Ethernet data frame and a corresponding frame status frame (FSF) from a second home phone line network data frame received from the home phone line network, if the control information is received from the hoMe phone line network. Control information is thus provided between the host and the HPNA network via an Ethernet controller without requiring additional hardware or special interfaces.

29 Claims, 8 Drawing Sheets

US 8,131,879 B1

USE OF ETHERNET FRAMES FOR EXCHANGING CONTROL AND STATUS INFORMATION WITHIN AN HPNA CONTROLLER

FIELD OF THE INVENTION

The present invention relates to the transmission of control information in a network, and more particularly to the transmission of control information between an Ethernet controller and a home phone line network via a home phone line network controller.

BACKGROUND OF THE INVENTION

Home networks are becoming more common and desirable for connecting computers within a home. One type of home network is the home phone line network which uses telephone lines typically installed in residential homes for communication between computers in the home. The Home Phone Line Networking Alliance (HPNA) has published a specification to standardize the behavior of home phone line networks.

FIG. 1 illustrates a home phone line network in accordance with the present invention. The preferred embodiment of the network complies with the Home Phoneline Networking Alliance specification version 2.0 (HPNA 2.0). The network allows multiple computers to communicate through telephone wires typically installed in residential homes. The HPNA network 116 communicates with a HPNA controller 100. The HPNA controller 100 comprises a Media Independent Interface (MII) 106, a Media Access Control (MAC) 108, and a Physical Layer (PHY) 110. The HPNA controller 100 implements the HPNA 2.0 specification. The HPNA controller 100 receives HPNA data frames from the HPNA network 116 through the telephone wires via a phone jack 102. There is an analog front end (AFE) 104 which processes the signal between the HPNA controller 100 and the HPNA network 116. The HPNA controller 100 then processes the HPNA data frames received in the signal from the AFE 104, and outputs a signal to a Host 112, which has a driver 118 for the HPNA controller 100, through an Ethernet controller 114.

FIG. 2 illustrates a structure of a HPNA data frame according to the HPNA 2.0. The HPNA data frame structure 240 comprises a 16-byte preamble field 218, a 4-byte frame control field 220, a 6-byte destination address field 222, a 6-byte source address field 224, a 2-byte Ethernet type field 226, a variable length Ethernet data field 228, a 4-byte Frame Check Sequence field (FCS) 230, a 2-byte Cyclic Redundancy Check field (CRC) 232, a 2-byte PAD field 234, and an 1-byte End Of Frame field (EOF) 236. According to the HPNA 2.0, the Host 112 must pass extra control information that is not present in a conventional Ethernet data frame 238. Similarly, the HPNA controller 100 must pass to the Host 112 extra frame control and status information that is not present in the conventional Ethernet data frame 238. The control information is contained in the frame control field 220. The HPNA data frame structure 240 is equivalent to a structure of the conventional Ethernet data frame 238 encapsulated within additional information, including the control information in the frame control field 220.

The control information includes priority and payload encoding. Priority information refers to the priority given to the HPNA data frame when determining media access. Payload encoding refers to codes for Baud rates and carrier frequencies to be used for data frame transmission.

However, when sending data frames to the Host 112 via the Ethernet controller 114, the Ethernet controller 114 can only process frames with the Ethernet data frame structure 238 and is not able to process the additional control information in a HPNA data frame structure 240. Additional wires can be installed between the Ethernet controller 114 and the HPNA controller 100 and between the Ethernet controller 114 and the Host 112 for transmission of the additional control information with special interfaces to handle the data transmission on these wires. However, this solution may be impractical.

Accordingly, there exists a need for a method for providing control information between a host and a HPNA network via an Ethernet controller. The method should not require additional wires or special interfaces. The present invention addresses such a need.

SUMMARY OF THE INVENTION

A method for providing control information between a host and a home phone line network via an Ethernet controller includes: determining if the control information is to be transmitted to the home phone line network or is received from the home phone line network; generating a first home phone line network data frame from a frame control frame (FCF) and a corresponding first Ethernet data frame received from the Ethernet controller, if the control information is to be transmitted to the home phone line network; and generating a second Ethernet data frame and a corresponding frame status frame (FSF) from a second home phone line network data frame received from the home phone line network, if the control information is received from the home phone line network. Control information is thus provided between the host and the HPNA network via an Ethernet controller without requiring additional hardware or special interfaces.

DETAILED DESCRIPTION

Figure 1:
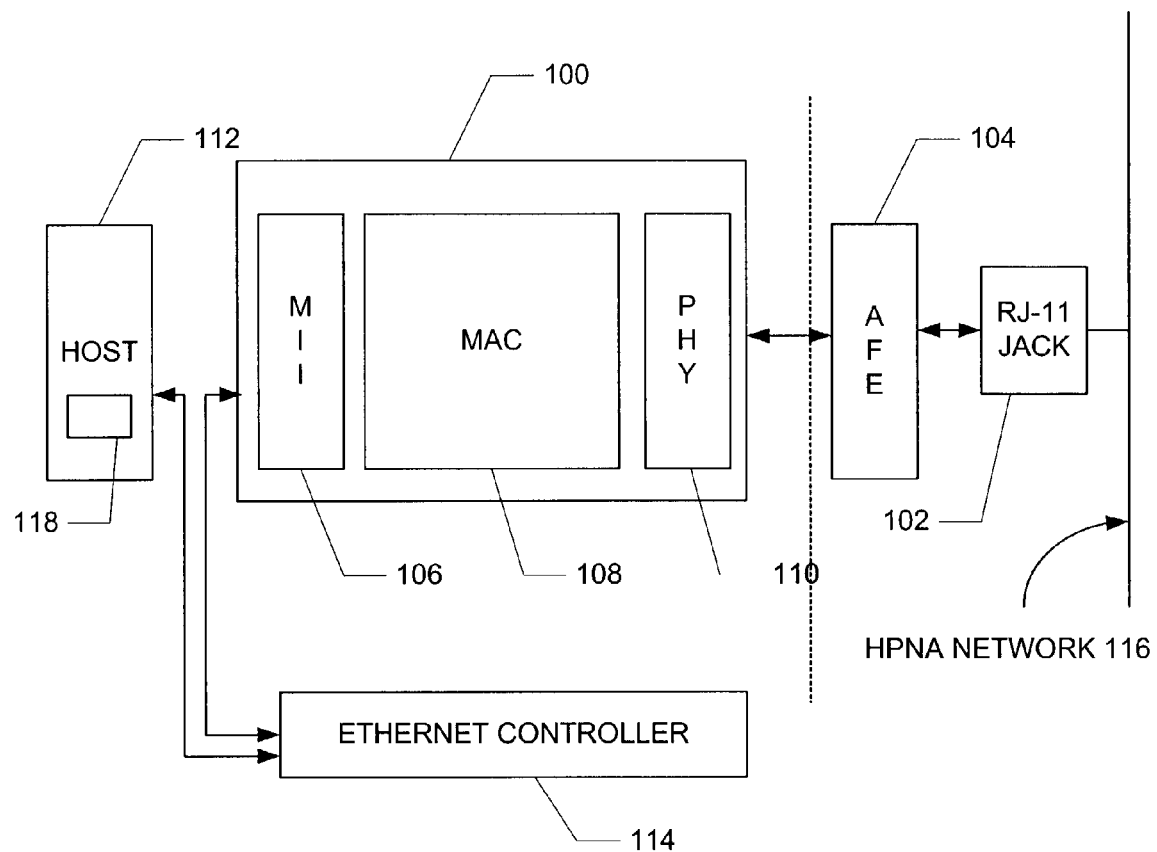
FIG. 1 illustrates a home phone line network in accordance with the present invention.

The present invention provides a method for providing control information between a host and a HPNA network via an Ethernet controller. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown but is to be accorded the widest scope consistent with the principles and features described herein.

The method in accordance with the present invention provides control information between a host 112 and a HPNA controller 100 via an Ethernet controller 114 in a frame with a conventional Ethernet data frame structure 238. The HPNA controller 100 communicates with the HPNA network 116 with HPNA data frame structures 240, while the HPNA controller 100 communicates with the host 112, via the Ethernet controller 114, with Ethernet data frame structures 238.

When data is transmitted from the host 112 to the HPNA network 116, a Frame Control Frame (FCF) containing the control information and a corresponding Ethernet data frame containing the actual data are transmitted to the HPNA controller 100. The HPNA controller 100 generates a HPNA data frame from the FCF and its corresponding Ethernet data frame, which is transmitted to the HPNA network 116.

When data is transmitted from the HPNA network 116 to the host 112 via the Ethernet controller 114, a HPNA data frame is transmitted to the HPNA controller 100. The HPNA controller 100 generates an Ethernet data frame containing the actual data. It also extracts the control information and generates a corresponding Frame Status Frame (FSF) to contain the control information. The Ethernet data frame and the FSF are transmitted to the host 112 via the Ethernet controller 114. Both the FCF and the FSF have the conventional Ethernet data frame structures 238. Thus, the Ethernet controller 114 is able to process them.

To more particularly describe the features of the present invention, please refer to FIGS. 3 through 6B in conjunction with the discussion below.

Figure 3:
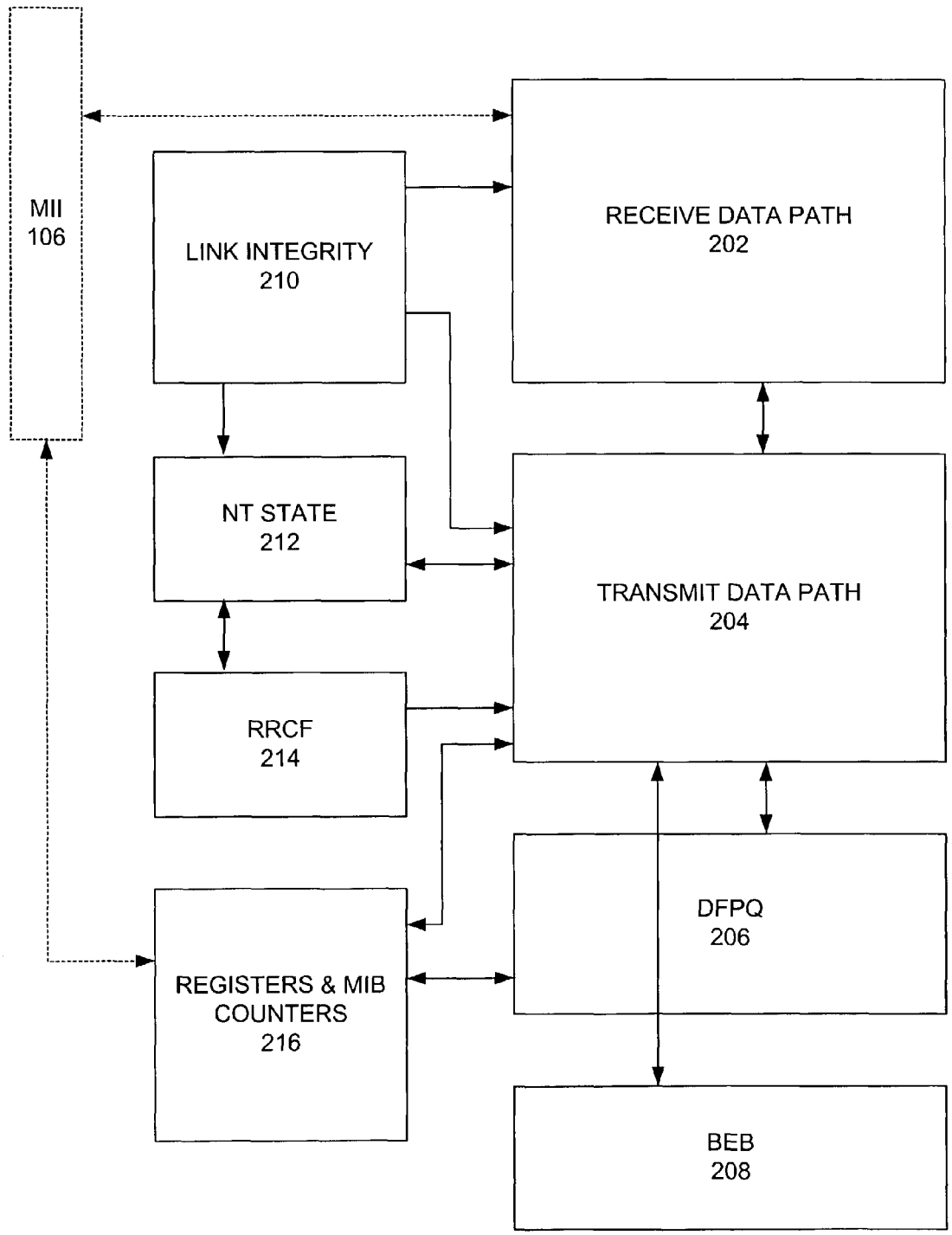
FIG. 3 illustrates a preferred embodiment of a MAC for a HPNA controller in accordance with the present invention.

FIG. 3 illustrates a preferred embodiment of a MAC for a HPNA controller in accordance with the present invention. The MAC 108 comprises a Receive Data Path 202, a Transmit Data Path 204, a Distributed Fair Priority Queuing (DFPQ) 206, a Binary Exponential Backoff (BEB) 208, a Link Integrity 210, a Network State 212, a Rate Request Control Frame (RRCF) 214, and a plurality of registers and Management Information Base (MIB) counters 216.

The Receive Data Path 202 receives data frames from the PHY 110 and sends data packets to the MII 106.

The Transmit Data Path 204 receives data frame from the MII 106 and transmits them to the PHY 110.

The DFPQ 206 and the BEB 208 provide collision resolution. The HPNA 2.0 specification supports both a 10 megabyte per second (mbps) data rate and a 1 mbps data rate. The DFPQ 206 provides collision resolution for the 10 mbps data rate, while the BEB 208 provides collision resolution for the 1 mbps data rate. In the preferred embodiment, the PHY 110 will provide a collision detect signal. Either the DFPQ 206 or the BEB 208 will then attempt to resolve the collision.

The Link Integrity 210 monitors the physical network conditions. In the preferred embodiment, the Link Integrity 210 updates a link status bit in a link register.

The Network State 212 monitors the current mode of the MAC 108, i.e., whether the MAC 108 is operating in the 10 mbps data rate mode ("10M8") or the 1 mbps data rate mode ("1M8").

The RRCF block 214 sends a RRCF whenever the MAC 108 transitions between data rates. The RRCF is used to perform the rate negotiation function, i.e., to determine what is the data rate to communicate between different stations in a home phone line network.

The registers and MIB counters 216 provides programmability to the MAC 108 and handles error event counting.

Figure 2:
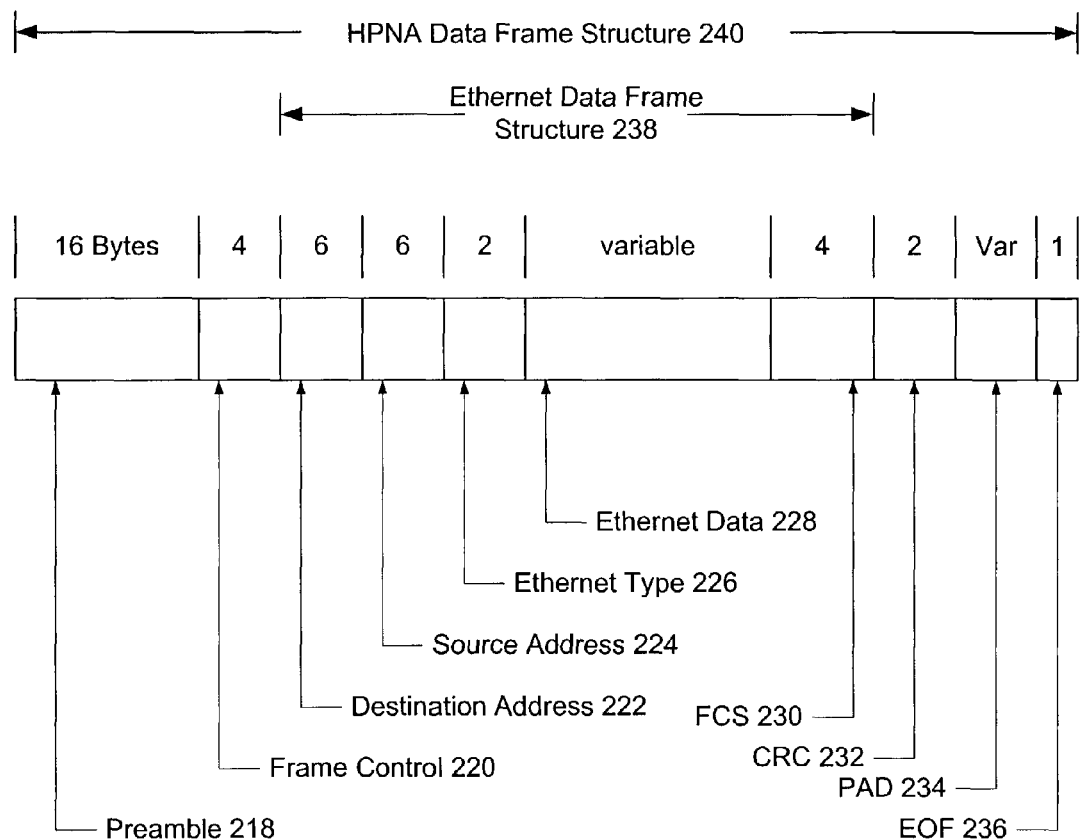
FIG. 2 illustrates a structure of a HPNA data frame according to the HPNA 2.0.
Figure 4:
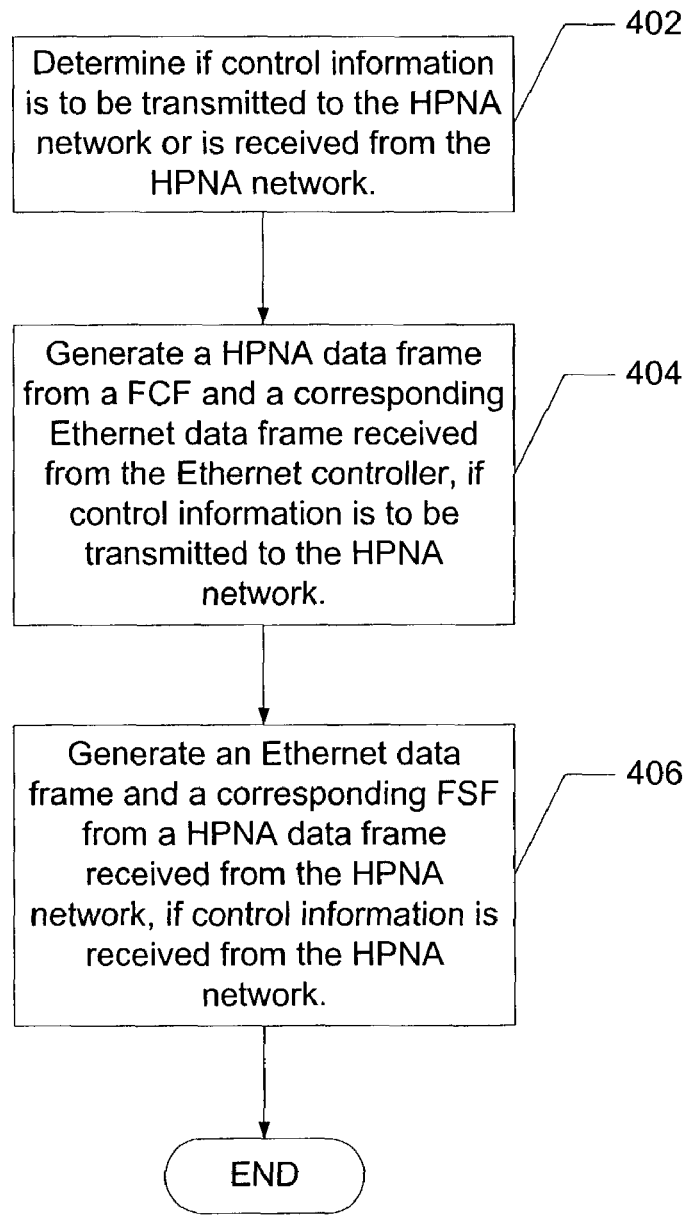
FIG. 4 is a flowchart illustrating a preferred embodiment of a method for providing control information between a host and a HPNA network via an Ethernet controller in accordance with the present invention.

FIG. 4 is a flowchart illustrating a preferred embodiment of a method for providing control information between a host and a HPNA network via an Ethernet controller in accordance with the present invention. First, the HPNA MAC 108 determines if control information is to be transmitted to the HPNA network 116 or is received from the HPNA network 116, via step 402. If the control information is to be transmitted to the HPNA network 116, then the Transmit Data Path 204 generates a HPNA data frame with the HPNA data frame structure 240 (FIG. 2), using information from a Frame Control Frame (FCF) and its corresponding Ethernet data frame, via step 404, received from the Ethernet controller 114. The FCF contains the control information and has the same structure as the conventional Ethernet data frame 238. The Ethernet data frame contains the actual information.

If the control information is received from the HPNA network 116, then the Receive Data Path 202 generates an Ethernet data frame and a corresponding Frame Status Frame (FSF), via step 406. The FSF contains the control information and has the same structure as the conventional Ethernet data frame 238. The Ethernet data frame contains the actual data.

Because the FCF and the FSF have conventional Ethernet data structures, they can be processed by the Ethernet controller 114 without requiring additional hardware or special interfaces.

Figure 5A:
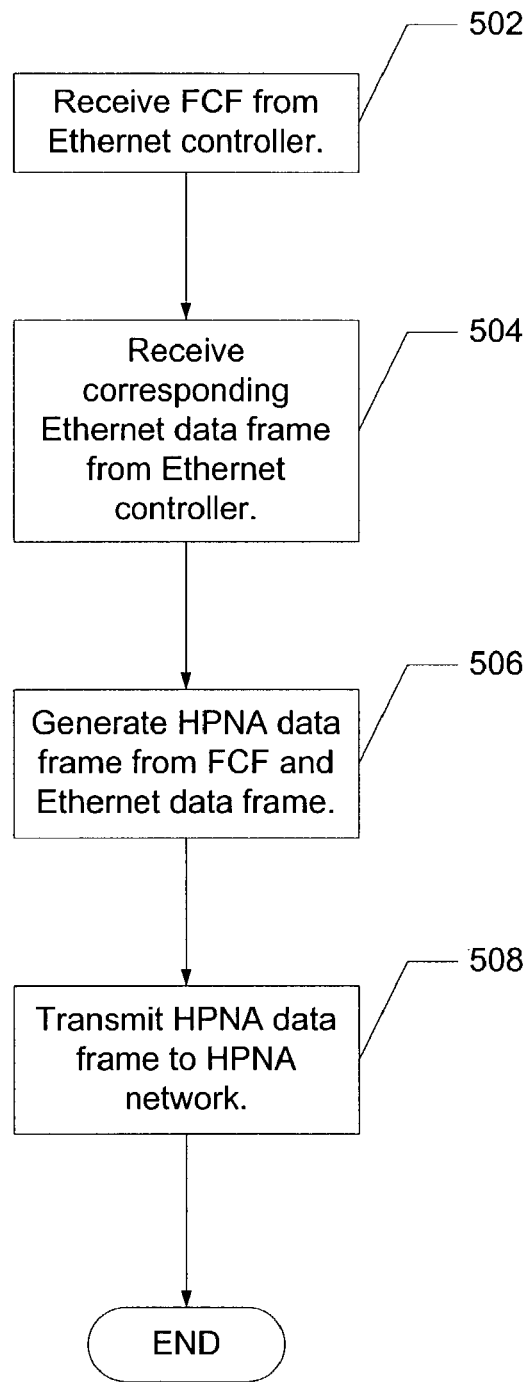
FIGS. 5A and 5B are a flowchart and a block diagram, respectively, illustrating in more detail the transmission of control information from a host to the HPNA network via an Ethernet controller in accordance with the present invention.
Figure 5B:
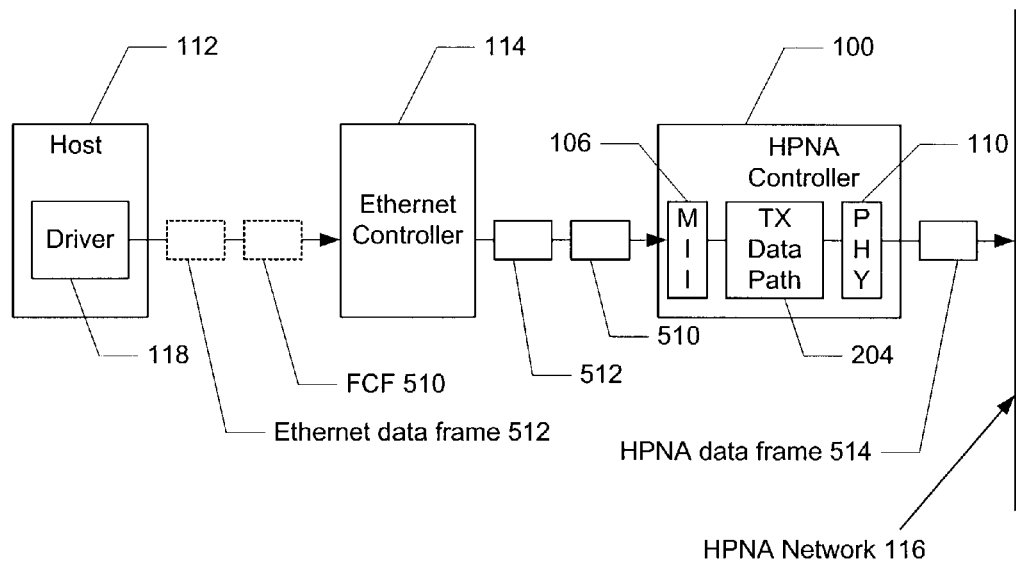

FIGS. 5A and 5B are a flowchart and a block diagram, respectively, illustrating in more detail the transmission of control information from a host to the HPNA network via an Ethernet controller in accordance with the present invention. Referring to both FIGS. 5A and 5B, a FCF 510 and an Ethernet data frame 512 are generated by the driver 118 at the Host 112 and transmitted to the Ethernet controller 114. The FCF 510 contains the control information, such as payload encoding and priority information, in its Ethernet data field and corresponds to the Ethernet data frame 512. The Ethernet data frame 512 contains the actual data in its Ethernet data field 228. To distinguish the FCF 510 from its corresponding Ethernet data frame 512, the source address field 224 and the Ethernet type field 226 of the FCF 510 contains only zeros.

In the preferred embodiment, the transmission of the FCF 510 precedes the transmission of the Ethernet data frame 512. Because both the FCF 510 and the Ethernet data frame 512 have conventional Ethernet data frame structures 238, the Ethernet controller 114 is able to process them without additional hardware or special interfaces.

The Ethernet controller 114 then transmits the FCF 510 and the Ethernet data frame 512 to the Transmit Data Path 204 of the HPNA controller 110. Since the FCF 510 is transmitted first, it is received first by the Transmit Data Path 204, via step 502. The Transmit Data Path 204 then receives the Ethernet data frame 512 corresponding to the FCF 510, via step 504. The Transmit Data Path 204 generates a HPNA data frame 514 with the HPNA data frame structure 240 (FIG. 2), by combining the control information from the FCF 510 and the actual data from its corresponding Ethernet data frame 512, via step 506. The HPNA data frame 514 is then transmitted to the HPNA network 116, via step 508.

Figure 6A:
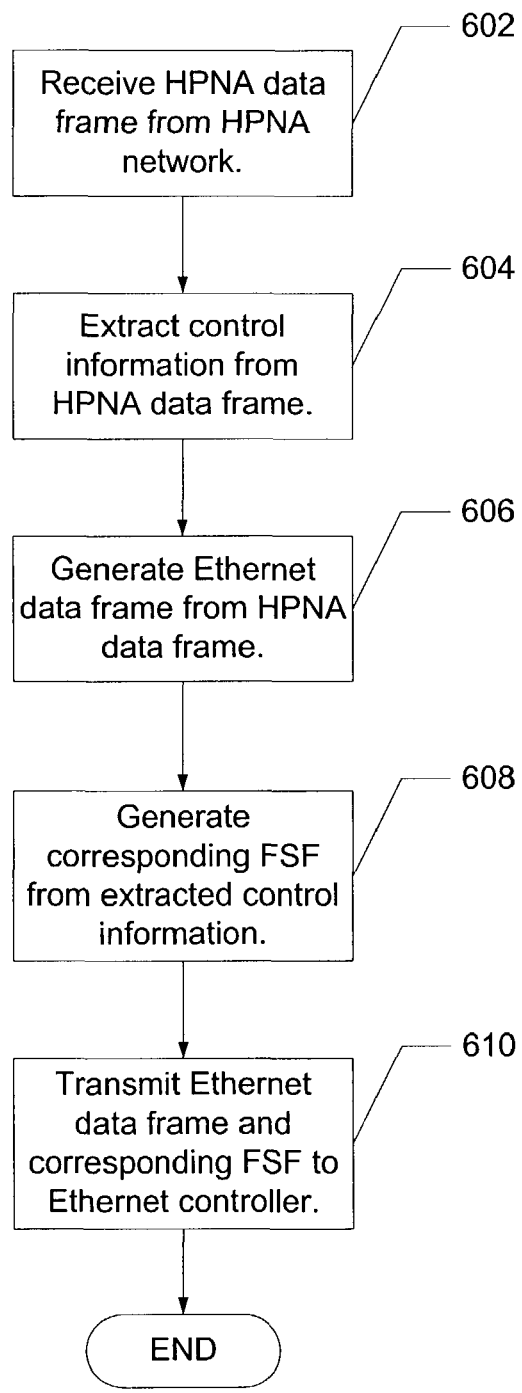
FIGS. 6A and 6B are a flowchart and a block diagram illustrating in more detail the transmission of control information from the HPNA network to a host via an Ethernet controller in accordance with the present invention.
Figure 6B:
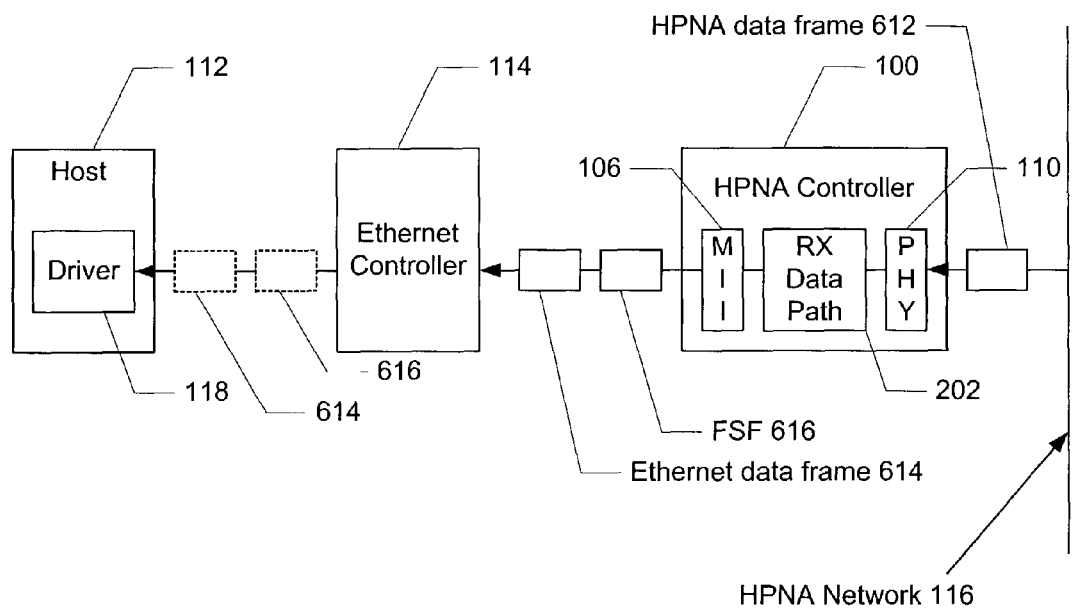

FIGS. 6A and 6B are a flowchart and a block diagram illustrating in more detail the transmission of control information from the HPNA network to a host via an Ethernet controller in accordance with the present invention. Referring to both FIGS. 6A and 6B, a HPNA data frame 612 from the HPNA network 116 is received by the Receive Data Path 202 of the HPNA controller 100, via step 602. The HPNA data frame 612 has the HPNA data frame structure 240 (FIG. 2), with the control information contained in the frame control field 220 and the actual data contained in the Ethernet data field 228. The Receive Data Path 202 extracts the control information from the HPNA data frame 612, via step 604.

The Receive Data Path 202 next generates an Ethernet data frame 614 from the HPNA data frame 612, via step 606, and generates a FSF 616 from the extracted control information, via step 608. In the Ethernet data field 228, the FSF 616 thus contains the control information, such as payload encoding and priority information from the frame control field 220 of the HPNA data frame 612, the source address from the source address field 224 of the HPNA data frame 612, signal quality information generated by the PHY 110, and transmission error information generated by the Receive Data Path 202. The Ethernet data frame 614 contains the actual data from the HPNA data frame 612. To distinguish the FSF 616 from its corresponding Ethernet data frame 614, the source address field 224 and the Ethernet type field 226 of the FSF 616 contains only zeros.

The Ethernet data frame 614 and the FSF 616 are transmitted to the Ethernet controller 114, via step 610. The destination address field 222 of the FSF 616 is copied from the destination address field 222 of the HPNA data frame 612 so that the Ethernet controller 114 will accept the FSF 616 as a frame that is addressed to it. In the preferred embodiment, the transmission of the Ethernet data frame 614 precedes the transmission of the FSF 616. Because both the Ethernet data frame 614 and the FSF 616 have the conventional Ethernet data frame structures 238, the Ethernet controller 114 is able to process them without requiring additional hardware or special interfaces.

The Ethernet controller 114 then transmits the Ethernet data frame 614 and the FSF 616 to the driver 118 at the host 112. Since the Ethernet data frame 614 is transmitted first, it is received first by the driver 118. The driver 118 then receives the FSF 616 corresponding to the Ethernet data frame 614. The driver 118 then passes the actual data from the Ethernet data frame 614 to an upper layer software (not shown).

A method for providing control information between a host and a HPNA network via an Ethernet controller has been disclosed. The method provides control information in a frame with a conventional Ethernet data frame structure. When data is transmitted from the host to the HPNA network, a Frame Control Frame (FCF) containing the control information and a corresponding Ethernet data frame containing the actual data are transmitted to the HPNA controller. The HPNA controller generates a HPNA data frame from the FCF and its corresponding Ethernet data frame, which is transmitted to the HPNA network. When data is transmitted from the HPNA network to the host via the Ethernet controller, a HPNA data frame is transmitted to the HPNA controller. The HPNA controller generates an Ethernet data frame containing the actual data. It also extracts the control information and generates a corresponding Frame Status Frame (FSF) to contain the control information. The Ethernet data frame and the FSF are transmitted to the host via the Ethernet controller. Both the FCF and the FSF have the structures of a conventional Ethernet data frame. Thus, the Ethernet controller is able to process them. In this manner, control information is provided between the host and the HPNA network via an Ethernet controller without requiring additional hardware or special interfaces.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method for providing control information between a host and a home phone line network via an Ethernet controller, comprising the steps of:
   (a) determining if the control information is to be transmitted to the home phone line network or is received from the home phone line network;
   (b) generating a first home phone line network data frame from a frame control frame (FCF) and a corresponding first Ethernet data frame received from the Ethernet controller, if the control information is to be transmitted to the home phone line network; and
   (c) generating a second Ethernet data frame and a corresponding frame status frame (FSF) from a second home phone line network data frame received from the home phone line network, if the control information is received from the home phone line network.

2. The method of claim 1, wherein the generating step (b) comprises:
   (b1) receiving the FCF from the Ethernet controller, wherein the FCF comprises the control information;
   (b2) receiving the corresponding first Ethernet data frame from the Ethernet controller; and
   (b3) generating the first home phone line network data frame from the FCF and the corresponding first Ethernet data frame.

3. The method of claim 2, further comprising:
   (b4) transmitting the first home phone line network data frame to the home phone line network.

4. The method of claim 1, wherein the generating step (c) comprises:
   (c1) receiving the second home phone line network data frame from the home phone line network;
   (c2) extracting the control information for the second home phone line network data frame;
   (c3) generating the second Ethernet data frame from the second home phone line network data frame; and
   (c4) generating the corresponding FSF from the extracted control information, wherein the FSF comprises the control information.

5. The method of claim 4, further comprising:
   (c5) transmitting the second Ethernet data frame and the corresponding FSF to the host via the Ethernet controller.

6. The method of claim 1, wherein the control information comprises priority and payload encoding, if the control information is to be transmitted to the home phone line network.

7. The method of claim 1, wherein the control information comprises priority, payload encoding, error information, and signal quality information, if the control information is received from the home phone line network.

8. The method of claim 1, wherein the FCF has an Ethernet data frame structure.

9. The method of claim 1, wherein the FSF has an Ethernet data frame structure.

10. A method for providing control information between a host and a home phone line network via an Ethernet controller, comprising the steps of:
    (a) receiving a Frame Control Frame (FCF) from the Ethernet controller, wherein the FCF comprises the control information;
    (b) receiving a corresponding Ethernet data frame from the Ethernet controller;

(c) generating a home phone line network data frame from the FCF and the corresponding Ethernet data frame; and (d) transmitting the home phone line network data frame to the home phone line network.

11. The method of claim 10, wherein the control information comprises priority and payload encoding.

12. The method of claim 10, wherein the FCF has an Ethernet data frame structure.

13. A method for providing control information between a host and a home phone line network via an Ethernet controller, comprising the steps of:

(a) receiving a home phone line network data frame from the home phone line network;

(b) extracting the control information from the home phone line network data frame;

(c) generating an Ethernet data frame from the home phone line network data frame;

(d) generating a corresponding Frame Status Frame (FSF) from the extracted control information, wherein the corresponding FSF comprises the control information; and (e) transmitting the Ethernet data frame and the corresponding FSF to the host via the Ethernet controller.

14. The method of claim 13, wherein the control information comprises priority, payload encoding, error information, and signal quality information.

15. The method of claim 13, wherein the FSF has an Ethernet data frame structure.

16. A home phone line network, comprising:

a transmit data path logic block for transmitting a control information to a home phone line network, comprising logic for generating a first home phone line network data frame from a FCF and a corresponding first Ethernet data frame received from an Ethernet controller; and a receive data path logic block for receiving the control information from the home phone line network, comprising logic for generating a second Ethernet data frame and a corresponding FSF from a second home phone line network data frame received from the home phone line network.

17. The controller of claim 16, wherein the transmit data path logic block comprises logic for:

receiving the FCF from the Ethernet controller, wherein the FCF comprises the control information;

receiving the corresponding first Ethernet data frame from the Ethernet controller; and generating the first home phone line network data frame from the FCF and the first corresponding Ethernet data frame.

18. The controller of claim 16, wherein the receive data path logic block comprises logic for:

receiving the second home phone line network data frame from the home phone line network;

extracting the control information from the second home phone line network data frame;

generating the second Ethernet data frame from the second home phone line network data frame; and generating the corresponding FSF from the extracted control information, wherein the corresponding FSF comprises the control information.

19. The controller of claim 16, wherein the control information transmitted by the transmit data path logic block comprises priority and payload encoding.

20. The controller of claim 16, wherein the control information received by the receive data path logic block comprises priority, payload encoding, error information, and signal quality information.

21. The controller of claim 16, wherein the FCF has an Ethernet data frame structure.

22. The controller of claim 16, wherein the FSF has an Ethernet data frame structure.

23. A system, comprising:

an Ethernet controller;

a home phone line network; and a home phone line network controller coupled to the Ethernet controller and to the home phone line network, wherein the home phone line network controller comprises:

a transmit data path logic block for transmitting a control information to the home phone line network, comprising logic for generating a first home phone line network data frame from a FCF and a corresponding first Ethernet data frame received from the Ethernet controller, and a receive data path logic block for receiving the control information from the home phone line network, comprising logic for generating a second Ethernet data frame and a corresponding FSF from a second home phone line network data frame received from the home phone line network.

24. The system of claim 23, wherein the transmit data path logic block comprises logic for:

receiving the FCF from the Ethernet controller, wherein the FCF comprises the control information;

receiving the corresponding first Ethernet data frame from the Ethernet controller; and generating the first home phone line network data frame from the FCF and the first corresponding Ethernet data frame.

25. The system of claim 23, wherein the receive data path logic block comprises logic for:

receiving the second home phone line network data frame from the home phone line network;

extracting the control information from the second home phone line network data frame;

generating the second Ethernet data frame from the second home phone line network data frame; and generating the corresponding FSF from the extracted control information, wherein the corresponding FSF comprises the control information.

26. The system of claim 23, wherein the control information transmitted by the transmit data path logic block comprises priority and payload encoding.

27. The system of claim 23, wherein the control information received by the receive data path logic block comprises priority, payload encoding, error information, and signal quality information.

28. The system of claim 23, wherein the FCF has an Ethernet data frame structure.

29. The system of claim 23, wherein the FSF has an Ethernet data frame structure.

* * * * *